United States Patent
Hosaka et al.

(10) Patent No.: US 8,238,667 B2
(45) Date of Patent: Aug. 7, 2012

(54) MOVING IMAGE CREATING APPARATUS, MOVING IMAGE CREATING METHOD, AND PROGRAM

(75) Inventors: Hisashi Hosaka, Tokyo (JP); Kosuke Kimura, Tokyo (JP); Kuniichiro Naruse, Tokyo (JP); Mitsuo Okumura, Tokyo (JP); Yukiko Sakata, Tokyo (JP); Shinji Kimura, Tokyo (JP); Sadamichi Bamba, Kanagawa (JP)

(73) Assignee: Sony Corporation, Tokyo (JP)

( * ) Notice: Subject to any disclaimer, the term of this patent is extended or adjusted under 35 U.S.C. 154(b) by 1020 days.

(21) Appl. No.: 12/196,737

(22) Filed: Aug. 22, 2008

(65) Prior Publication Data
US 2009/0052734 A1 Feb. 26, 2009

(30) Foreign Application Priority Data
Aug. 24, 2007 (JP) .................................. 2007-217832

(51) Int. Cl.
*G06K 9/64* (2006.01)
(52) U.S. Cl. ...................................................... 382/217
(58) Field of Classification Search .................. 382/209, 382/217, 218, 224, 229, 305; 358/403; 707/728, 707/731, 779, 821, 828
See application file for complete search history.

(56) References Cited

U.S. PATENT DOCUMENTS

| | | | |
|---|---|---|---|
| 6,954,894 B1 | 10/2005 | Baln Aves et al. | |
| 7,519,200 B2* | 4/2009 | Gokturk et al. | 382/118 |
| 2002/0019833 A1* | 2/2002 | Hanamoto | 707/500 |
| 2003/0002715 A1 | 1/2003 | Kowald | |
| 2003/0147465 A1* | 8/2003 | Wu et al. | 375/240.11 |
| 2004/0064455 A1* | 4/2004 | Rosenzweig et al. | 707/100 |
| 2004/0096110 A1* | 5/2004 | Yogeshwar et al. | 382/239 |
| 2005/0102201 A1* | 5/2005 | Linker et al. | 705/27 |
| 2006/0007328 A1 | 1/2006 | Paulsen et al. | |
| 2007/0064121 A1* | 3/2007 | Issa et al. | 348/231.2 |
| 2007/0116433 A1* | 5/2007 | Manico et al. | 386/95 |
| 2007/0156524 A1* | 7/2007 | Grouf et al. | 705/14 |
| 2007/0203942 A1* | 8/2007 | Hua et al. | 707/104.1 |

FOREIGN PATENT DOCUMENTS

| | | |
|---|---|---|
| EP | 1 083 567 A2 | 3/2001 |
| EP | 1 408 424 A2 | 4/2004 |
| JP | 2002-142188 | 5/2002 |

* cited by examiner

*Primary Examiner* — Jason M Repko
*Assistant Examiner* — Shervin Nakhjavan
(74) *Attorney, Agent, or Firm* — Oblon, Spivak, McClelland, Maier & Neustadt, L.L.P.

(57) ABSTRACT

A moving image creating apparatus includes a memory that stores a plurality of template files each of which holds a plurality of component templates each for accommodating an image. An input device that selects any one of the template files stored in the memory. A processing unit analyzes metadata about each of a plurality of images. The processing unit analyzes metadata about each of the component templates in the selected template file. Further, the processing unit places the images into the component templates of the selected template file in accordance with the analyzed metadata about the images and the analyzed metadata about the component templates and places one of the images into one of the component templates of the selected template file, in response to a determination that none of the metadata about each of the images matches the analyzed metadata about the one of the component templates.

11 Claims, 13 Drawing Sheets

FIG.11

☐ DATAILED MOVIE SETTINGS

MUSIC TO BE USED IN THE MOVIE

- ● USE THE MUSIC OF THE TEMPLATE (T)
- ○ DESIGNATE THE MUSIC (S)
  - MUSIC FILE (U): [          ] [SELECT(E)...]

LENGTH OF THE MOVIE

- ● ADJUST TO THE LENGTH OF THE MUSIC (A)
- ○ DESIGNATE THE LENGTH (P)
  - [3] MIN. [0] SEC.

SOUNDS OF THE MOVING IMAGE CPMPONENTS

- ● COMPLY WITH THE TEMPLATE SETTINGS (M)
- ○ USE THE SOUNDS OF ALL MOVING IMAGE COMPONENTS (I)
- ○ USE NONE OF THE SOUNDS OF THE MOVING IMAGE COMPONENTS (N)

ASPECT RATIO

- ○ 4:3   ● 16:9

[RESET TO DEFAULT (D)]   [OK]   [CANCEL]

81A — 81B — 81C

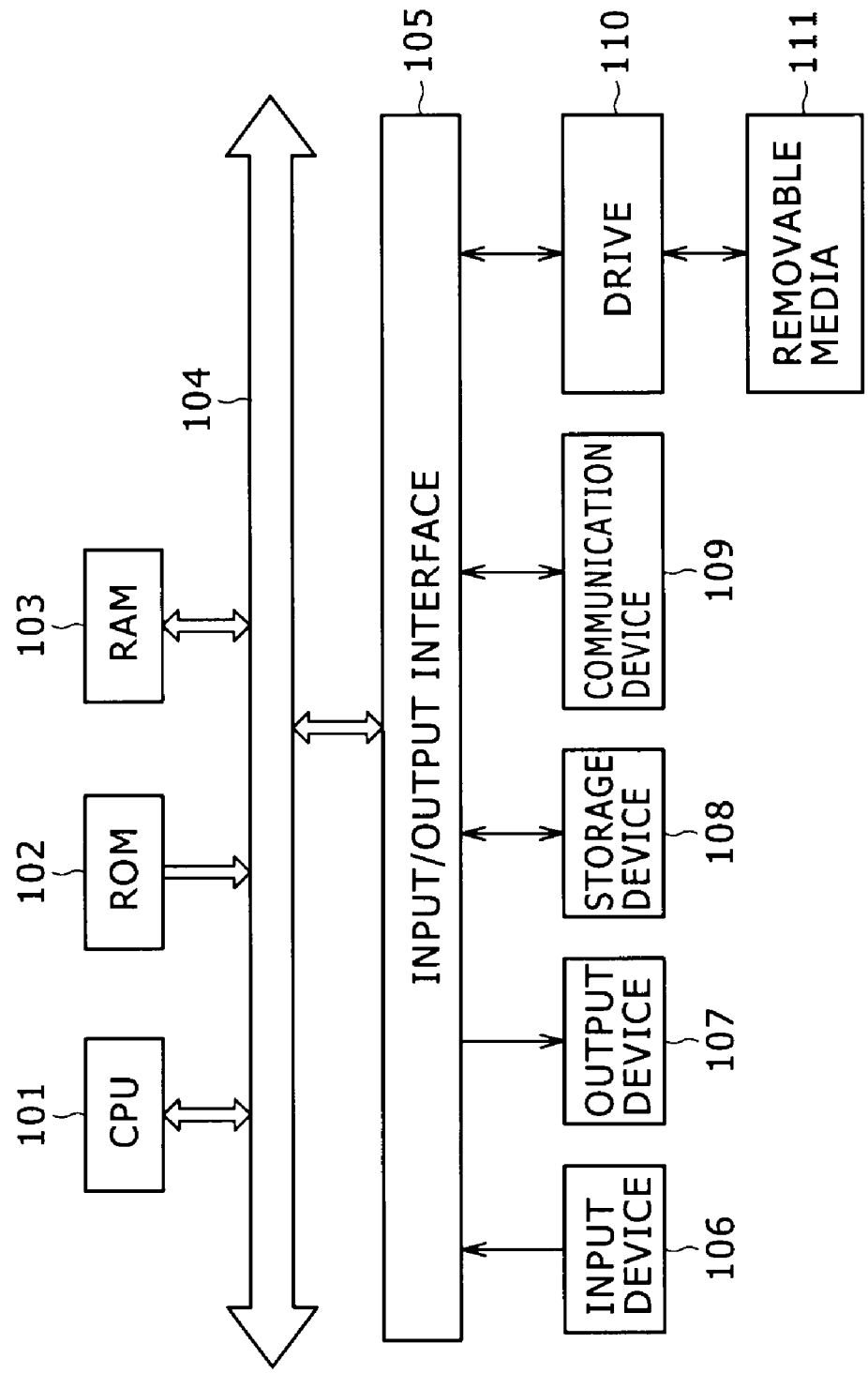

MOVING IMAGE CREATING APPARATUS, MOVING IMAGE CREATING METHOD, AND PROGRAM

CROSS REFERENCES TO RELATED APPLICATIONS

The present invention contains subject matter related to Japanese Patent Application JP 2007-217832 filed with the Japan Patent Office on Aug. 24, 2007, the entire contents of which being incorporated herein by reference.

BACKGROUND OF THE INVENTION

1. Field of the Invention

The present invention relates to a moving image creating apparatus, a moving image creating method, and a program. More particularly, the invention relates to a moving image creating apparatus, a moving image creating method, and a program for easily creating moving image data furnished with dramatic accompaniments such as musical compositions and special effects.

2. Description of the Related Art

In recent years, some personal computers (PCs) have come to be equipped with the capability of enabling users to edit the still and moving images they took and create photo albums (electronic albums) using such images.

Illustratively, Japanese Patent Laid-open No. 2001-285784 (called the Patent Document 1 hereunder) discloses an image editing process that allows the user to designate images stored on a hard disk drive or the like. According to the process, the designated images are suitably edited (in what is called the effect process) before being displayed one by one in keeping with prepared music (BGM). This process is characterized by the capability to randomly determine the effects to be applied to the images so that the same designated images can be made into different contents.

Japanese Patent Laid-open Nos. 2006-86621, 2006-86622 and 2006-166164 (called the Patent Documents 2, 3 and 4 respectively hereunder) disclose techniques for allowing the user to choose from prepared musical compositions and to select a photo album that contains the still images desired to be reproduced. The still images are then processed to reflect the atmosphere of the selected musical composition and made into a slide-show content (i.e., play list) displayed one image after another to the accompaniment of the music.

According to the image editing process disclosed by the above-cited Patent Document 1, the eventual content to be created is unpredictable, and may or may not conform to the user's expectations. That is because the same designated images are turned randomly into different contents.

With any one of the techniques disclosed by the Patent Documents 1 through 4, the user needs to designate the images to be processed into contents. The user may well find it irksome and time-consuming to search numerous images in stock for those desired to be processed.

SUMMARY OF THE INVENTION

The present invention has been made in view of the above circumstances and provides arrangements for creating moving image data together with dramatic accompaniments such as musical compositions and special effects more easily than before.

In carrying out the present invention and according to one embodiment thereof, there is provided a moving image creating apparatus for creating moving image data using a plurality of images, the moving image creating apparatus including: template file storage means for storing a plurality of template files each of which holds a plurality of component templates for accommodating an image each; selection means for selecting any one of the plurality of template files stored in the template file storage means; component metadata analysis means for analyzing metadata about each of the plurality of images; component template metadata analysis means for analyzing metadata about each of the plurality of component templates in the selected template file; and image placement means for placing the images into the component templates of the selected template file in accordance with the analyzed metadata about the images and the analyzed metadata about the component templates.

Preferably, the image placement means may check to determine whether the metadata about any one of the images matches the metadata about any one of the component templates and place the image with the matching metadata into the matching component template of the template file.

Preferably, each of the template files may include time-series information defining whether or not images are to be placed chronologically into the plurality of component templates; the moving image creating apparatus of the present invention further including time-series determination means for determining whether or not the selected template file is defined to permit time-series placement of images; wherein, if the selected template file is defined to permit time-series placement of images, then the image placement means may place the images chronologically into the component templates of the selected template file.

Preferably, the moving image creating apparatus of the present invention may further include image storage means for storing the plurality of images; wherein, from among the images stored in the image storage means, the selection means may select preferred images to be placed preferentially into the component templates of the selected template file; and wherein the image placement means may place the preferred images preferentially into the component templates of the selected template file.

Preferably, the moving image creating apparatus of the present invention may further include screen creation means for creating a screen on which to display thumbnails of the plurality of images; wherein the screen creation means may highlight the thumbnail corresponding to the information represented by the metadata about the images.

Preferably, each of the template files may hold background music constituting a musical composition to be played during image reproduction.

According to another embodiment of the present invention, there is provided a moving image creating method for carrying out a moving image creating process which creates moving image data using a plurality of images, the moving image creating method including the following steps. The steps are: selecting any one of a plurality of template files each of which holds a plurality of component templates for accommodating an image each; analyzing metadata about each of the plurality of images; analyzing metadata about each of the plurality of component templates in the selected template file; and placing the images into the component templates of the selected template file in accordance with the analyzed metadata about the images and the analyzed metadata about the component templates.

According to a further embodiment of the present invention, there is provided a program for causing a computer to carry out a moving image creating process which creates moving image data using a plurality of images, the moving image creating process including the following steps. The steps are: selecting any one of a plurality of template files each of which holds a plurality of component templates for accommodating an image each; analyzing metadata about each of the plurality of images; analyzing metadata about each of the plurality of component templates in the selected template file; and placing the images into the component templates of the selected template file in accordance with the analyzed metadata about the images and the analyzed metadata about the component templates.

According to a further embodiment of the present invention, there is provided a recording medium which stores a program for causing a computer to carry out a moving image creating process for creating moving image data using a plurality of images, the moving image creating process including the following steps. The steps are: selecting any one of a plurality of template files each of which holds a plurality of component templates for accommodating an image each; analyzing metadata about each of the plurality of images; analyzing metadata about each of the plurality of component templates in the selected template file; and placing the images into the component templates of the selected template file in accordance with the analyzed metadata about the images and the analyzed metadata about the component templates.

According to the present invention embodied as outlined above, an appropriate template file is selected from a plurality of template files. The metadata about each of a plurality of component templates in the selected template file is then analyzed, and so is the metadata about each of a plurality of images in the component templates. On the basis of the analyzed metadata about the images and component templates, the images are placed into the component templates of the selected template files.

Where any of the above-outlined embodiments of the present invention is in use, it is possible to create moving image data along with dramatic accompaniments such as musical compositions and special effects more easily than before.

BRIEF DESCRIPTION OF THE DRAWINGS

Further objects and advantages of the present invention will become apparent upon a reading of the following description and appended drawings in which:

FIG. 11 is a schematic view showing a typical detail setting screen;

FIG. 12 is a block diagram showing a typical structure of a computer embodying the present invention.

DETAILED DESCRIPTION OF THE PREFERRED EMBODIMENTS

Figure 1:
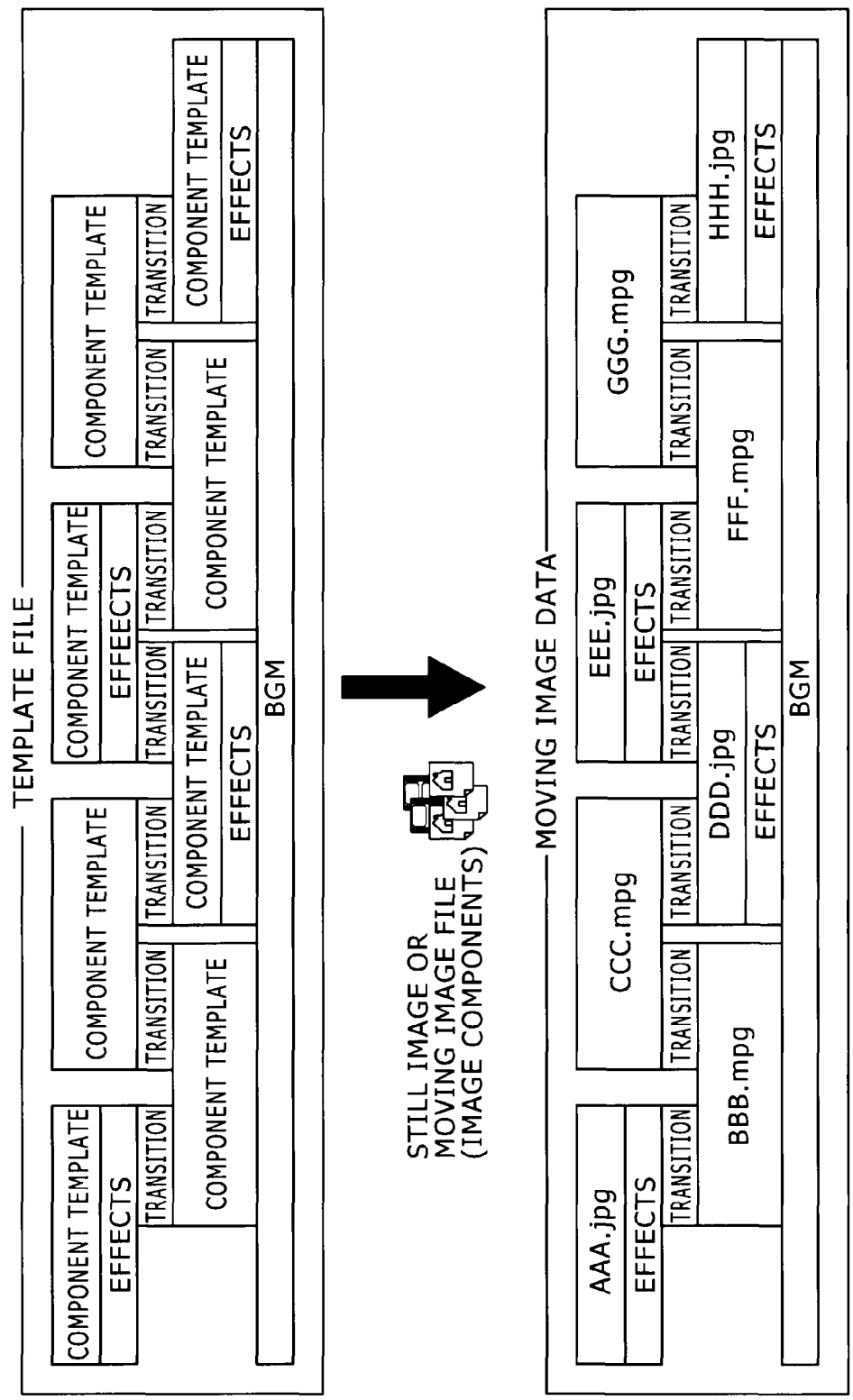
FIG. 1 is a schematic view conceptually depicting a template file and moving image data.

What is described below as the preferred embodiments of the present invention with reference to the accompanying drawings corresponds to the appended claims as follows: the description of the preferred embodiments basically provides specific examples supporting what is claimed. If any example of the invention described below as a preferred embodiment does not have an exactly corresponding claim, this does not means that the example in question has no relevance to the claims. Conversely, if any example of the invention depicted hereunder has a specifically corresponding claim, this does not mean that the example in question is limited to that claim or has no relevance to other claims.

One embodiment of the present invention is a moving image creating apparatus for creating moving image data using a plurality of images, the moving image creating apparatus including: template file storage means (e.g., template file database 12 in FIG. 2) for storing a plurality of template files each of which holds a plurality of component templates for accommodating an image each; selection means (e.g., operation input section 15 in FIG. 2) for selecting any one of the plurality of template files stored in the template file storage means; component metadata analysis means (e.g., component metadata analysis block 32 in FIG. 3) for analyzing metadata about each of the plurality of images; component template metadata analysis means (e.g., component template metadata analysis block 36 in FIG. 3) for analyzing metadata about each of the plurality of component templates in the selected template file; and image placement means (e.g., image placement block 37 in FIG. 3) for placing the images into the component templates of the selected template file in accordance with the analyzed metadata about the images and the analyzed metadata about the component templates.

Preferably, each of the template files may include time-series information defining whether or not images are to be placed chronologically into the plurality of component templates; the embodiment of the present invention further including time-series determination means (e.g., time-series determination block 35 in FIG. 3) for determining whether or not the selected template file is defined to permit time-series placement of images; wherein, if the selected template file is defined to permit time-series placement of images, then the image placement means may place the images chronologically into the component templates of the selected template file.

Preferably, the embodiment of the present invention may further include image storage means (e.g., component database 11 in FIG. 2) for storing the plurality of images; wherein, from among the images stored in the image storage means, the selection means may select preferred images to be placed preferentially into the component templates of the selected template file; and the image placement means may place the preferred images preferentially into the component templates of the selected template file.

Preferably, the embodiment of the present invention may further include screen creation means (e.g., screen creation section 13 in FIG. 2) for creating a screen on which to display thumbnails of the plurality of images; wherein the screen creation means may highlight the thumbnail corresponding to the information represented by the metadata about the images.

Preferably, in the embodiment of the present invention, each of the template files may hold at least one effect template and at least one transition template in addition to the plurality of component templates for accommodating an image each, the effect template defining an effect to be applied to an image, the transition template defining a type of transition to take place from the image placed in a first component template to the image placed in a second component template.

Another embodiment of the present invention is a moving image creating method for carrying out a moving image creating process which creates moving image data using a plurality of images, as well as a program for causing a computer to carry out the same moving image creating process, the moving image creating method or moving image creating process including the steps of: selecting (e.g., in step S1 of FIG. 6) any one of a plurality of template files each of which holds a plurality of component templates for accommodating an image each; analyzing (e.g., in step S3 of FIG. 6) metadata about each of the plurality of images; analyzing (e.g., in step S5 of FIG. 6) metadata about each of the plurality of component templates in the selected template file; and placing (e.g., in step S7 of FIG. 6) the images into the component templates of the selected template file in accordance with the analyzed metadata about the images and the analyzed metadata about the component templates.

The preferred embodiments of the present invention will now be described in reference to the accompanying drawings.

Outlined below with reference to FIG. 1 is the moving image creating process performed by the moving image creating apparatus practiced as one embodiment of the present invention.

FIG. 1 is a schematic view conceptually depicting a template file and moving image data that is created by the moving image creating process using the template file.

The moving image creating apparatus internally stores a plurality of template files corresponding to diverse themes. The themes are subsumed in each of such classified categories as travel, kids, life, sports, and events. That is, each of the categories contains various themes representing different tastes. Each theme corresponds to a single template file. It is also possible to prepare a plurality of template files that may correspond to one theme.

As shown in FIG. 1, a template file defines background music (BGM), at least two component templates, at least one effect (in an effect template), and at least one transition (in a transition template), all associated with a timestamp representing the point in time from which the file is to be reproduced.

The background music (BGM) is a musical composition which corresponds to the theme of the template file in question and which is played as an accompaniment to the images as they are displayed (i.e., reproduced). Basically, the total reproduction time of the template file matches the playing time of the background music being played once (i.e., an entire musical composition played from beginning to end). If the total reproduction time of a given template file is set to be prolonged on a detail setting screen 81 in FIG. 11, as will be discussed later, then one musical composition is reproduced repeatedly.

Component templates are a kind of boxes (containers) in which to insert files of still images or moving images serving as image components. These templates may be arrayed in keeping with the varying tempo of the background music. Each component template has metadata that defines beforehand whether the template in question is to accommodate a still image or a moving image. Where a given component template is defined to have a still image inserted therein, the template in question may also be defined as needed to apply a predetermined effect to the inserted image, the effect being illustratively that of a zoom or of turning the color of the image into sepia. Where a component template is defined to have a moving image inserted therein, the template may likewise be defined to apply a predetermined effect to the inserted image.

In keeping with the timing of switching from one template (with an image) to the next (with another image) defined in a template file, a transition is placed therebetween. Such a transition defines how the current template (with its image) is to be replaced by the next template (with a new image). Typical transitions include a fade-in, a fade-out, and a left-to-right image shift. The transitions, along with the effects, are adopted in a manner conforming to the theme and taste of each template file.

The user may select one of such template files and designate creation of moving image data. In that case, as shown in FIG. 1, the moving image creating apparatus searches the still image and moving image files in the user's possession for the images fit for the templates of the selected template file and inserts the detected image files into the component templates. This process creates moving image data constituted by a series of images conforming to the theme of the template file, the created moving image data being provided with dramatic accompaniments such as background music, effects and transitions. In designating the creation of moving image data, the user may further designate preferred still images and moving images to be used preferentially in the template file.

The typical moving image data in FIG. 1 is shown to have still images "AAA.jpg," "DDD.jpg," "EEE.jpg" and "HHH.jpg," as well as moving images "BBB.mpg," "CCC.mpg," "FFF.mpg" and "GGG.mpg" inserted in their respective component templates.

As outlined above, the moving image creating process performed by the moving image creating apparatus is a process enabling the user easily to create moving image data in the form of a series of component images that are displayed sequentially in a dramatically staged manner involving the background music, effects, and transitions conforming to a given theme.

Figure 2:
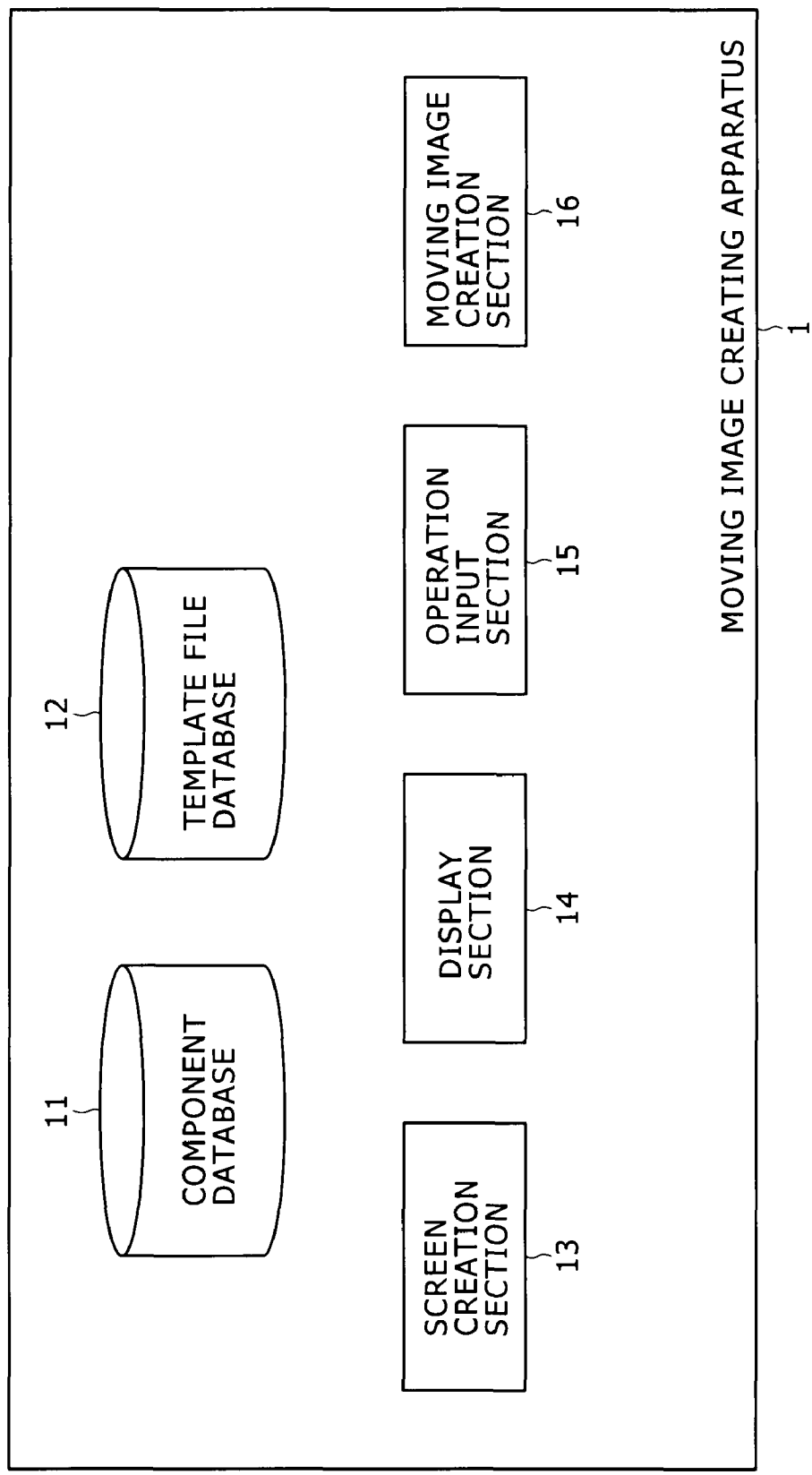
FIG. 2 is a block diagram showing a typical structure of a moving image creating apparatus embodying the present invention.

FIG. 2 is a block diagram showing a typical structure of a moving image creating apparatus 1 which performs the moving image creating process discussed above in reference to FIG. 1 and which is practiced as one embodiment of the present invention.

The moving image creating apparatus 1 is made up of a component database 11, a template file database 12, a screen creation section 13, a display section 14, an operation input section 15, and a moving image creation section 16.

The component database 11 is configured to store still image and moving image files in the user's possession, the files serving as image components to be inserted into the component templates of the selected template file. The template file database 12 is configured to store a plurality of template files which belong to such categories as travel, kids, life, sports and events and which conform to diverse themes.

The screen creation section 13 is configured to create a moving image creation designation screen serving as a user interface (UI) screen that allows the user to designate a desired template file and preferred image components to be used preferentially (called the preferred components below where appropriate).

The display section 14 is configured to display the moving image creation designation screen created by the screen creation section 13. The operation input section 15 is configured to accept the operations performed by the user while viewing the moving image creation designation screen displayed by the display section 14. The operations involve selection of the desired template file and designation of the preferred components.

The moving image creation section 16 is configured to create moving image data along with dramatic accompaniments such as background music and special effects conforming to a given theme based on the image components selected from the component database 11 and on the selected template file from the template file database 12 in accordance with the file and component settings designated through the operation input section 15, as explained above in reference to FIG. 1. The moving image creation section 16 proceeds to turn the created moving image data into a moving image file in a suitable format such as that of the MPEG (Moving Picture Experts Group) standard. The moving image file thus prepared can be recorded to such recording media as a hard disk drive, a semiconductor memory, or DVD (Digital Versatile Disc).

Figure 3:
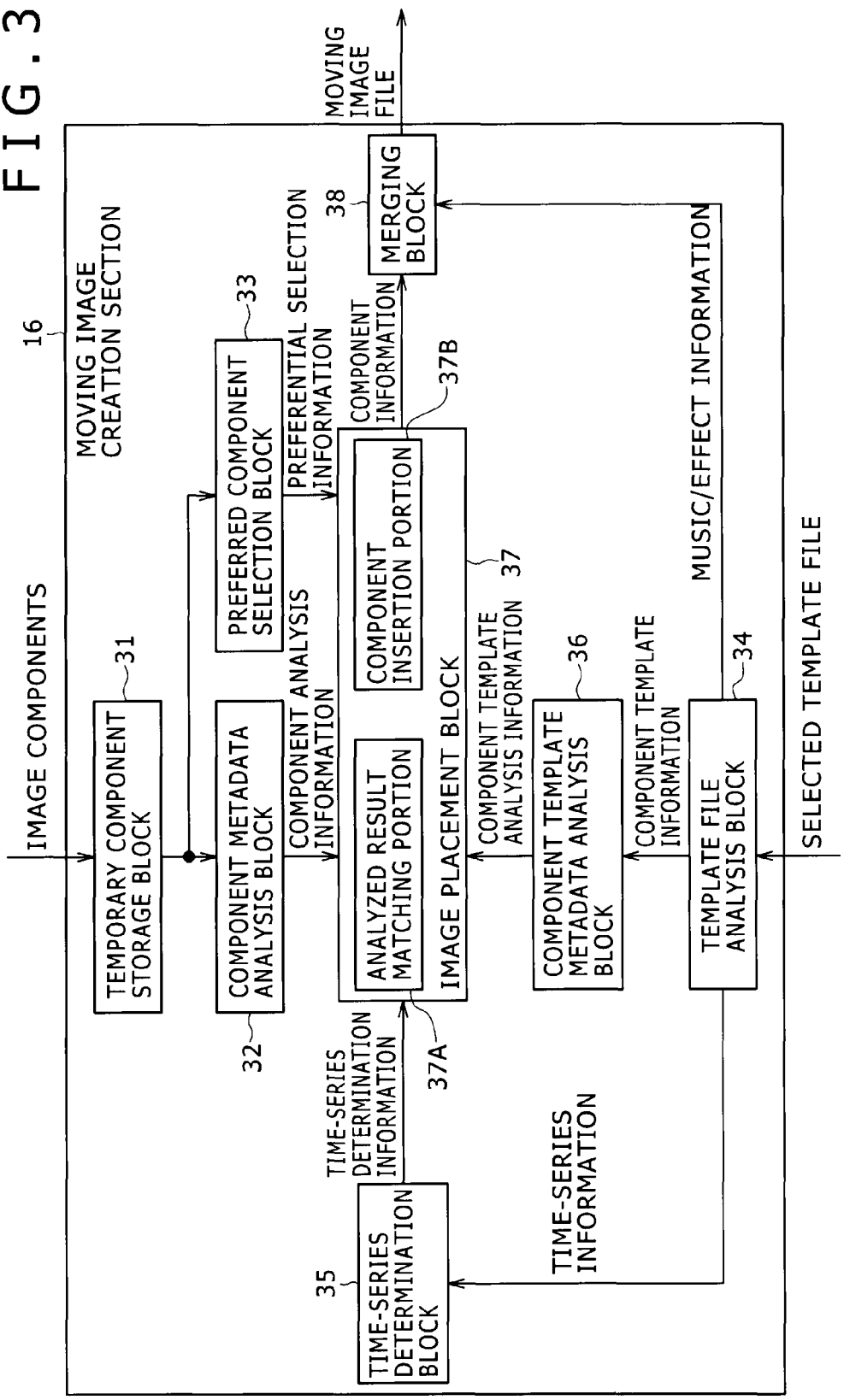
FIG. 3 is a block diagram showing a typical detailed structure of a moving image creation section.

FIG. 3 is a block diagram showing a typical detailed structure of the moving image creation section 16.

The moving image creation section 16 is made up of a temporary component storage block 31, a component metadata analysis block 32, a preferred component selection block 33, a template file analysis block 34, a time-series determination block 35, a component template metadata analysis block 36, an image placement block 37, and a merging block 38.

The moving image creation section 16 is supplied with the template file designated by the user as the selected template file from among the numerous template files stored in the template file database 12. The moving image creation section 16 is also fed with the image components designated by the user as the components that may be used in the selected template file, the designated image components being retrieved from the component database 11.

The temporary component storage block 31 temporarily retains a plurality of image components designated by the user. These image components are transferred as needed from the temporary component storage block 31 to the component metadata analysis block 32 and to the preferred component selection block 33.

On the assumption that the variety of image components held in the component database 11 is quite wide, this embodiment allows the user to select from the component database 11 those image components deemed usable in the moving image data (i.e., selected template file) and causes only the selected image components to be stored in the temporary component storage block 31. Alternatively, if the number of image components held in the component database 11 is small and if the image components stored in the component database 11 are subsumed under a known category, then the image components in the component database 11 may be sent directly from there to the component metadata analysis block 32 and to the preferred component selection block 33. In this case, the temporary component storage block 31 may be omitted.

The component metadata analysis block 32 analyzes all image components stored in the temporary component storage block 31. After analyzing each image component, the component metadata analysis block 32 creates metadata as information defining whether the image component in question is a still image or a moving image, whether the number of people in the image is small (one to three people) or large (four or more people), and whether their faces are in a close-up. The component metadata analysis block 32 associates the metadata about each image component with the image component in question, and sends the metadata to the image placement block 37 as component analysis information.

The preferred component selection block 33 extracts from the temporary component storage block 31 the information about the preferred components (preferential selection information) designated by the user as the image components to be used preferentially in the selected template file. The extracted information is supplied to the image placement block 37.

The template file analysis block 34 analyzes the selected template file fed from the template file database 12. The analysis enables the template file analysis block 34 to obtain time-series information indicating whether the selected template file is a file that requires image components to be placed chronologically into component templates; component template information defining a start point, an end point and other settings of each of the component templates involved; and music/effect information indicating specific music and effects applied to specific points in the template file. The template file analysis block 34 proceeds to send the time-series information to the time-series determination block 35, the component template information to the component template metadata analysis block 36, and the music/effect information to the merging block 38.

Given the time-series information from the template file analysis block 34, the time-series determination block 35 checks to determine whether the selected template file is a file that requires image components to be placed chronologically into component templates. The time-series determination block 35 sends the result of the determination to the image placement block 37 as time-series determination information.

Based on the component template information from the template file analysis block 34, the component template metadata analysis block 36 analyzes the metadata attached to each of the component templates in the selected template file and forwards the results of the analysis to the image placement block 37 as component template analysis information. The component template analysis information is information which specifies the type of image component to be inserted into each of the component templates in the selected template file. As such, the component template analysis information constitutes metadata similar to component analysis information that defines whether each of the image components involved is a still image or a moving image, whether the number of people in the image in question is small or large, and whether their faces are in a close-up. Alternatively, the metadata may be replaced by some other appropriate information.

The image placement block 37 detects an optimum image component to be inserted into each of the component templates in the selected template file and places the detected image components into their respective component templates. More specifically, based on the metadata from the component metadata analysis block 32 and on the metadata from the component template metadata analysis block 36, the image placement block 37 checks the image components in the temporary component storage block 31 against the component templates in the selected template file. In some cases, there may be no specific metadata and any image component may then be placed in any component template.

The image placement block 37 inserts the image components with template-matching conditions into the corresponding component templates of the selected template file. In order to implement these functions, the image placement block 37 at least includes an analyzed result matching portion 37A and a component insertion portion 37B. When inserting the image components into the component templates of the selected template file, the image placement block 37 references the time-series determination information and preferential selection information as needed. Details of the processes performed by the image placement block 37 for inserting image components into component templates will be discussed later in reference to FIGS. 4 and 5.

The merging block 38 is supplied with component information resulting from the inserting processes carried out by the image placement block 37, the component information being arranged to associate the image components with the component templates in the selected template file. The merging block 38 is further supplied with music/effect information from the template file analysis block 34.

The merging block 38 merges the component information with the music/effect information to create moving image data. The moving image data is created in a predetermined format such as XML (extensible markup language). The merging block 38 converts the created moving image data into a moving image file in a suitable format such as that of the MPEG (Moving Picture Experts Group) standard, and outputs the moving image file thus generated.

Figure 4:
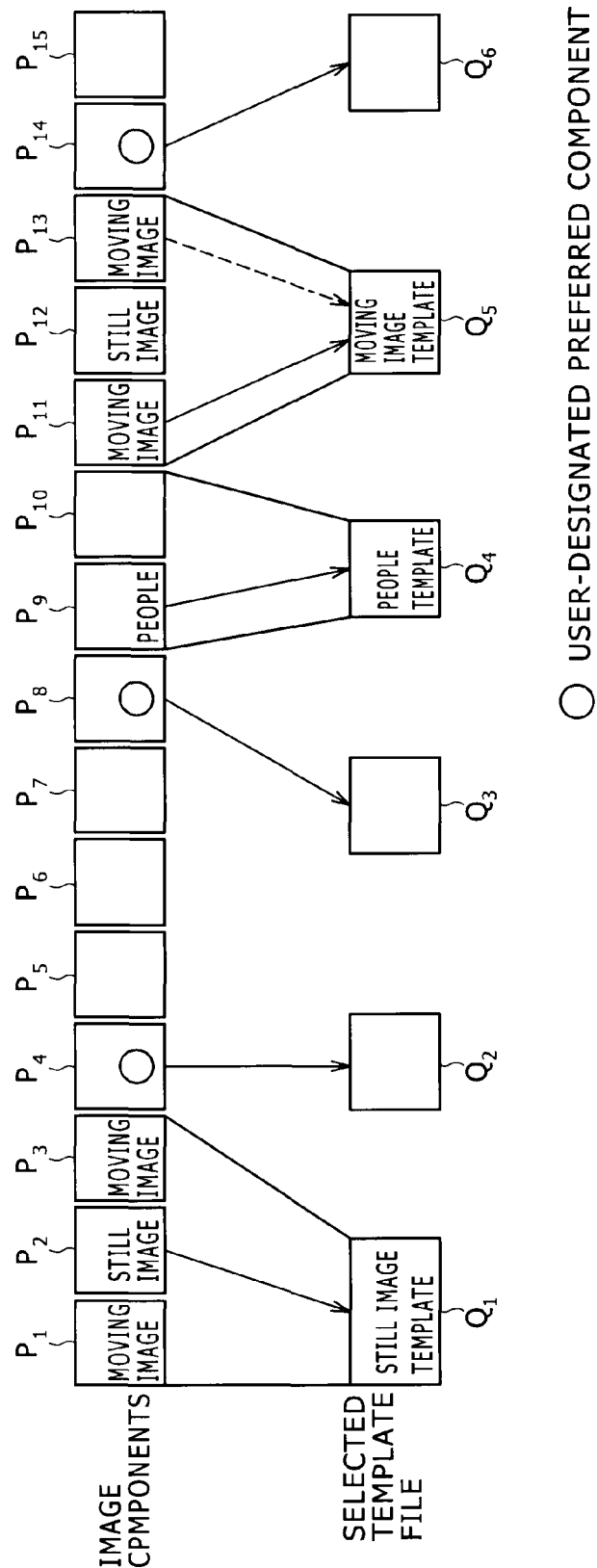
FIG. 4 is a schematic view explanatory of a first component inserting process.
Figure 5:
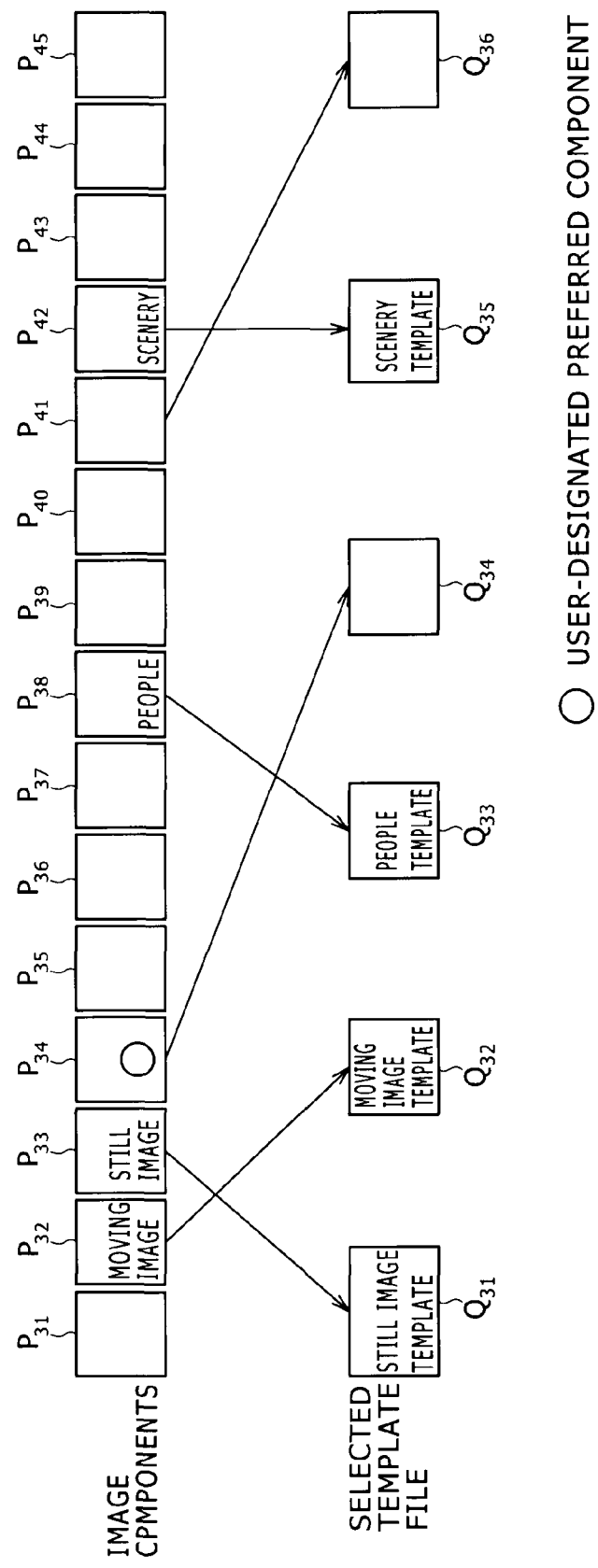
FIG. 5 is a schematic view explanatory of a second component inserting process.

Described below in reference to FIGS. 4 and 5 are the image component inserting processes performed by the image placement block 37.

FIG. 4 is a schematic view explanatory of the typical inserting process carried out when the selected template file is a file that requires time-series image component placement therein (called the first component inserting process where appropriate).

In the example of FIG. 4, it is assumed that image components $P_1$ through $P_{15}$ are held in the temporary component storage block 31 and that six component templates $Q_1$ through $Q_6$ are defined in the selected template file. Of the image components $P_1$ through $P_{15}$ in FIG. 4, those with their boxes containing a circle each are preferred components. The inscriptions in some of the boxes for the image components $P_1$ through $P_{15}$ represent metadata which is defined for the corresponding image components and extracted as component analysis information. In this example, the component analysis information "people" constitutes metadata defining whether the number of people in the image is small or large, or whether their faces are in a close-up. The inscriptions in some of the boxes for the component templates $Q_1$ through $Q_6$ represent metadata defined as component template analysis information about the corresponding component templates.

In the first component inserting process, the image placement block 37 first sorts chronologically the image components (i.e., by their timestamps) that are held in the temporary component storage block 31. The image components $P_1$ through $P_{15}$ in FIG. 4 are shown sorted chronologically.

Secondly, the image placement block 37 inserts the preferred components into the component templates of the selected template file in such a manner that the inserted components are kept in chronologically consistent relation to one another as much as possible between the image component $P_1$ and the image component $P_{15}$. Specifically, the image component $P_4$, a preferred component, is inserted into the second component template $Q_2$ between the component template $Q_1$ and the component template $Q_6$, the image component $P_8$ into the third component template $Q_3$, and the image component $P_{14}$ into the component template $Q_6$.

Whereas there is no metadata such as "still image template" or "moving image template" defined explicitly for the component templates $Q_2$, $Q_3$ and $Q_6$, the preferred components $P_4$, $P_8$ and $P_{14}$ are placed in a chronologically preferential manner into the component templates $Q_2$, $Q_3$ and $Q_6$ respectively regardless of whether the metadata defined for the component templates $Q_2$, $Q_3$ and $Q_6$ matches the metadata about the preferred components $P_4$, $P_8$ and $P_{14}$. Alternatively, with priority given to the metadata, a preferred component with its metadata not matching that of a chronologically determined component template may be shifted from the template and inserted into another template which precedes or follows that template and which is chronologically consistent with the preferred component.

Thirdly, for the component templates yet to accommodate image components (i.e., component templates for which the image components have yet to be determined), the image placement block 37 determines candidate image components to be inserted with their chronological relations maintained therebetween.

For the component template $Q_1$ in the example of FIG. 4, the image components $P_1$ through $P_3$ are determined as candidates to be inserted because they chronologically precede the image component $P_4$ inserted in the component template $Q_2$. For the component templates $Q_4$ and $Q_5$, the image components $P_9$ through $P_{13}$ are first determined as candidates to be inserted because they are positioned chronologically between the image component $P_8$ inserted in the component template $Q_3$ and the image component $P_{14}$ inserted in the component template $Q_6$. Then the image components $P_9$ and $P_{10}$ are determined as candidates to be inserted in the component template $Q_4$ while the image components $P_{11}$ through $P_{13}$ are selected as candidates to be inserted in the component template $Q_5$, so that the image components involved are kept chronologically consistent in their relations to one another.

Lastly, the image placement block 37 selects from the candidates the image component that matches the metadata defined for each component template and inserts the selected image component into the component template in question. If there exist a plurality of image components that match the metadata defined for a given component template, then the image placement block 37 may select any one of the candidate image components for the insertion.

In the example of FIG. 4, of the image components $P_1$ through $P_3$ as candidates to be inserted into the component template $Q_1$, the image component $P_2$ is selected for the insertion because the image component $P_2$ matches the metadata defined for the component template $Q_1$. Of the image components $P_9$ and $P_{10}$ as candidates to be inserted into the component template $Q_4$, the image component $P_9$ is selected for the insertion because the image component $P_9$ matches the metadata defined for the component template $Q_4$. Of the image components $P_{11}$ through $P_{13}$ as candidates to be inserted into the component template $Q_5$, the image component $P_{11}$ is selected for the insertion because the image component $P_{11}$ matches the metadata defined for the component template $Q_5$.

FIG. 5 is a schematic view explanatory of the inserting process carried out when the selected template file is a file that does not require time-series image component placement therein (called the second component inserting process where appropriate).

In the example of FIG. 5, it is assumed that image components $P_{31}$ through $P_{45}$ are held in the temporary component storage block 31 and that six component templates $Q_{31}$ through $Q_{36}$ are defined in the selected template file. It is also assumed that the image components $P_{31}$ through $P_{45}$ are not chronologically ordered and that the definitions of the metadata shown in the boxes of the image components $P_{31}$ through $P_{45}$ and the definitions of the metadata in the boxes of the component templates $Q_{31}$ through $Q_{36}$ are the same as those in the example of FIG. 4. It should be noted that the metadata "scenery" defined for the image component $P_{42}$ in FIG. 5 signifies the absence of people in the image and that the metadata "scenery template" in the component template $Q_{35}$ stands for an image of scenery alone.

In the second component inserting process, the image placement block 37 first inserts preferred components into component templates of the selected template file. At this point, if there exists a preferred image component that matches the metadata defined for any one of the component templates in the selected template file, then the preferred image component is inserted into the matching component template.

In the example of FIG. 5, no metadata is defined for the image component $P_{34}$ that is the preferred image component. That means the image component $P_{34}$ may be inserted into any component template, such as the component template $Q_{34}$.

Secondly, the image placement block 37 selects the image components that match the metadata defined for the component templates in which image components have yet to be inserted (i.e., component templates for which image components have yet to be determined), and inserts the selected image components into the component templates in question.

In the example of FIG. 5, the metadata "still image" is defined for the component template $Q_{31}$, so that the image component $P_{33}$ having the same metadata "still image" is inserted into the component template $Q_{31}$. In like manner, the image components $P_{32}$ and $P_{38}$ are inserted into the component templates $Q_{32}$ and $Q_{33}$ respectively. The metadata "scenery" is defined for the component template $Q_{35}$, so that the image component $P_{42}$ having the metadata "scenery" is inserted into the component template $Q_{35}$. Obviously, some other image component not having the metadata "people" may be inserted in place of the image component having the metadata "scenery." Since no metadata is defined for the component template $Q_{36}$, any image component, such as the image component $P_{41}$, may be inserted into that template.

Figure 6:
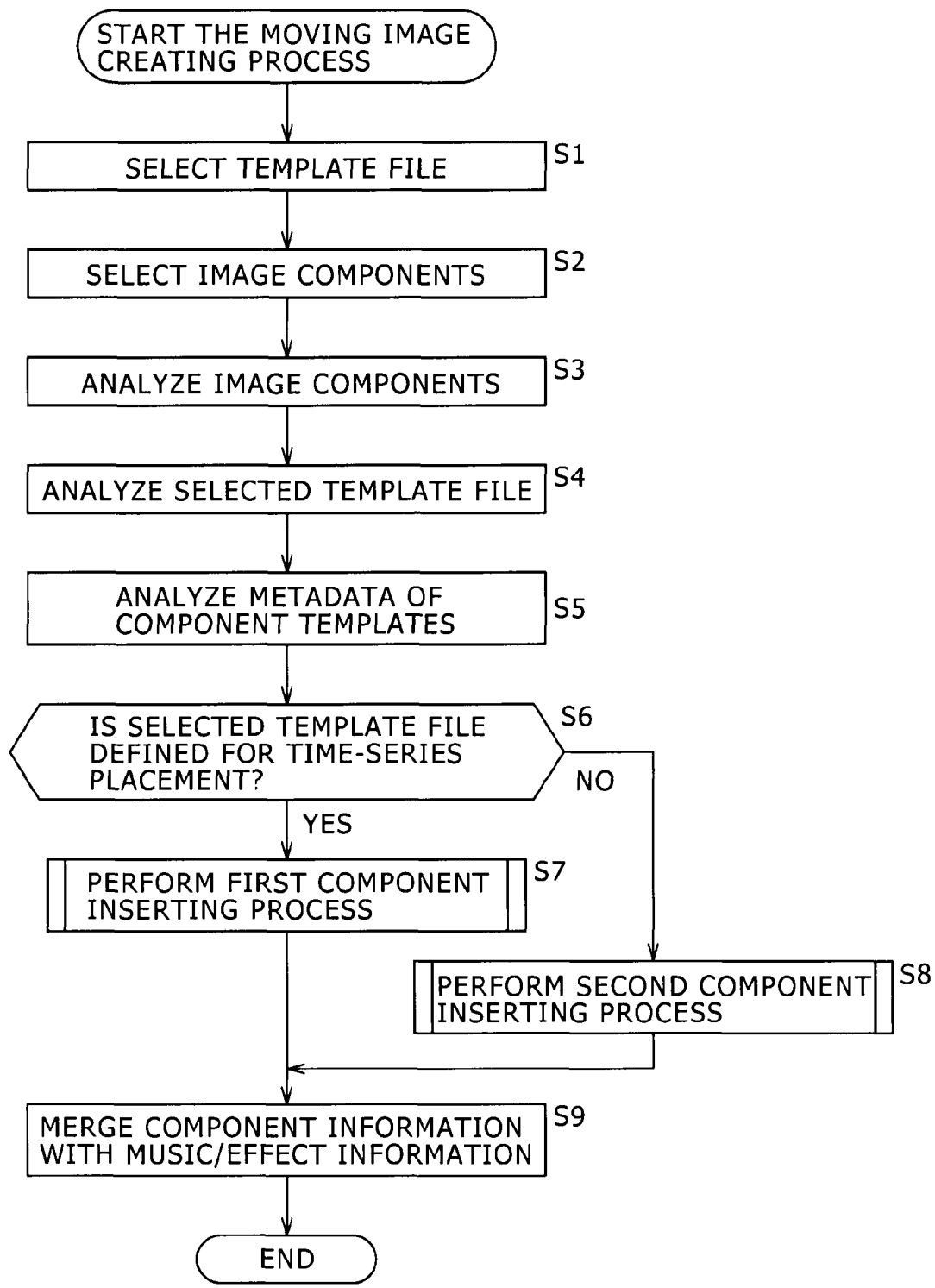
FIG. 6 is a flowchart of steps constituting a moving image creating process.

Described below in reference to the flowchart of FIG. 6 is an overall flow of the moving image creating process performed by the moving image creating apparatus 1. It is assumed that prior to this process, a plurality of image components selected by the user have been placed in the temporary component storage block 31.

The user first performs an operation to select a desired template file from among the numerous template files which are displayed in list form on a moving image creation designation screen and which are held in the template file database 12. In step S1, the operation input section 15 selects the template file in response to the user's operation and sends the selected template file to the moving image creation section 16.

On the moving image creation designation screen, the user may perform an operation to designate the preferred image component from among the image components stored in the temporary component storage block 31. In such a case, the operation input section 15 in step S2 selects the preferred image component in response to the user's operation and forwards the preferred component thus selected to the moving image creation section 16.

As will be discussed later in reference to FIG. 9 and other figures, the user may repeatedly select the template file and designate the preferred image component on the moving image creation designation screen. That is, in practice, steps S1 and S2 may be carried out repeatedly or parallelly in keeping with the user's operations.

After the selection of the template file and designation of the preferred image component, control is passed on to step S3. In step S3, the component metadata analysis block 32 analyzes all image components held in the temporary component storage block 31 and sends metadata as the results of the analysis to the image placement block 37 as component analysis information associated with the corresponding image components.

In step S4, the template file analysis block 34 analyzes the selected template file fed from the template file database 12. The analysis allows the template file analysis block 34 to supply time-series information to the time-series determination block 35, component template information to the component template metadata analysis block 36, and music/effect information to the merging block 38.

In step S5, based on the component template information from the template file analysis block 34, the component template metadata analysis block 36 analyzes the metadata defined for the component templates in the selected template file. The result of the analysis is sent to the image placement block 37 as component template analysis information.

In step S6, given the time-series information from the template file analysis block 34, the time-series determination block 35 checks to determine whether the selected template file is a file that requires time-series image component placement therein.

If in step S6 the selected template file is found to be a file requiring time-series image component placement, then step S7 is reached. If in step S6 the selected template file is not found to require time-series image component placement therein, then step S8 is reached. In step S7, the first component inserting process explained above in reference to FIG. 4 is carried out. In step S8, the second component inserting process discussed above in reference to FIG. 5 is executed.

Step S7 or S8 is followed by step S9. In step S9, the merging block 38 merges the component information with the music/effect information to create moving image data in a predetermined format such as XML. The merging block 38 converts the created moving image data in XML or like format to a moving image file in a suitable format such as that of the MPEG, and outputs the resulting moving image file. This terminates the moving image creating process.

Figure 7:
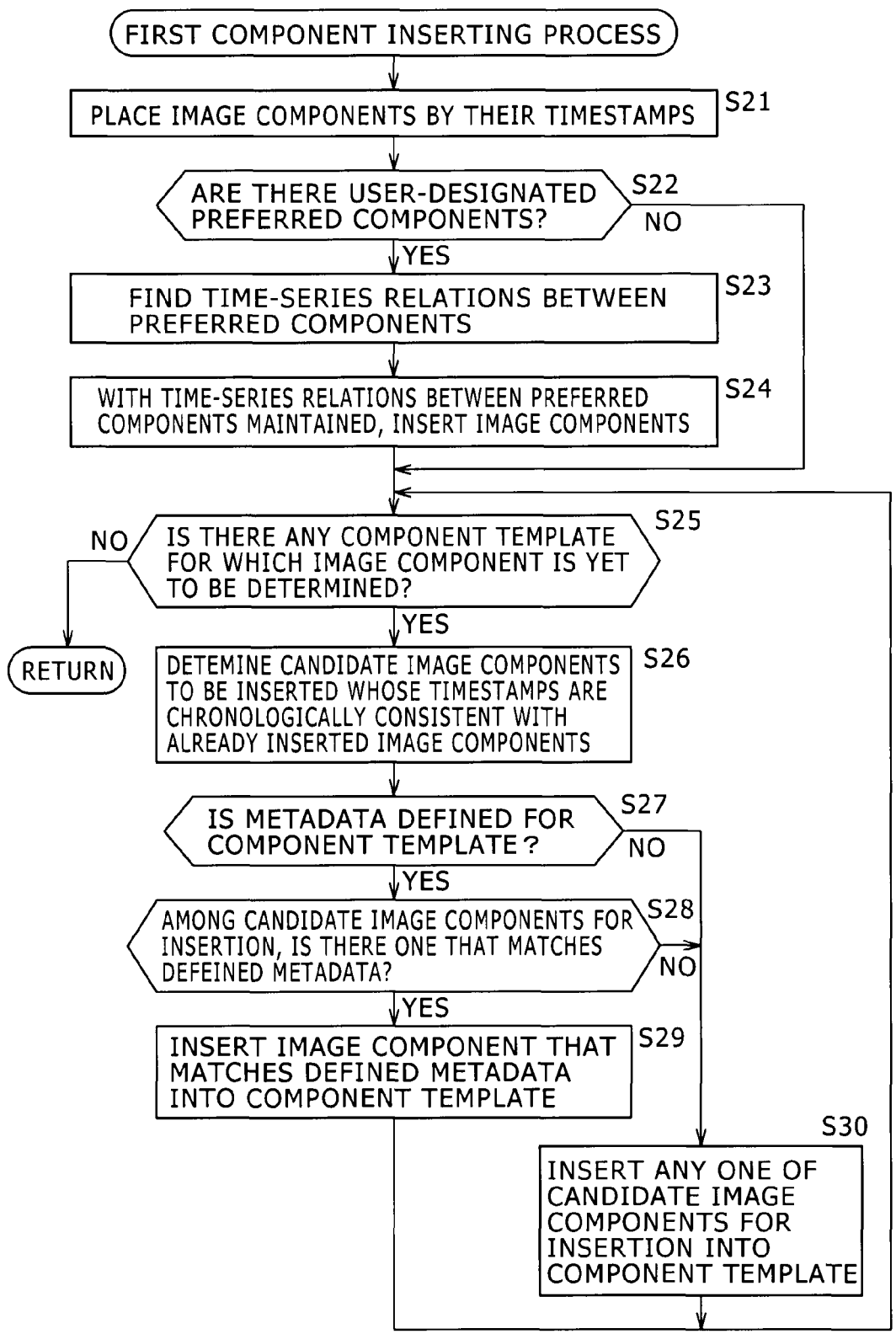
FIG. 7 is a flowchart of steps constituting the first component inserting process.

FIG. 7 is a flowchart of detailed steps constituting the first component inserting process performed in step S7 of FIG. 6.

In step S21, the image placement block 37 sorts the image components in the temporary component storage block 31 by their timestamps.

In step S22, based on the preferential selection information from the preferred component selection block 33, the image placement block 37 checks to determine whether there exist user-designated preferred components.

If in step S22 user-designated preferred components are found to exist, then step S23 is reached. In step S23, the image placement block 37 finds the time-series relations between the preferred components. More specifically, the image placement block 37 determines where each of the preferred components is ranked among all image components that are chronologically sorted.

In step S24, the image placement block 37 inserts all preferred components into relevant component templates of the selected template file in such a manner that the time-series relations between the preferred components are maintained.

If in step S22 no user-designated preferred components are found to exist, then steps S23 and S24 are skipped.

In step S25, the image placement block 37 checks to see whether the selected template file still contains any component template for which an image component has yet to be determined. If in step S25 a component template or templates that have yet to accommodate an image component therein are found to exist, then step S26 is reached. In step S26, with regard to one of the component templates with no image component placed therein, the image placement block 37 determines candidate image components to be inserted which are chronologically consistent with the already inserted image components.

In step S27, the image placement block 37 checks to determine whether metadata is defined for the component template. If in step S27 no metadata is found to be defined for the component template, then step S30 is reached (to be discussed later).

If in step S27 metadata is found to be defined for the component template, then step S28 is reached. In step S28, the image placement block 37 checks to determine whether any one of the candidate image components matches the defined metadata. If in step S28 none of the candidate image components is found to match the defined metadata, then step S30 is reached as well.

If in step S28 one of the candidate image components is found to match the defined metadata, then step S29 is reached. In step S29, the image placement block 37 inserts the matching image component into the component template in question. After step S29, control is returned to step S25.

In step S30, the image placement block 37 inserts any one of the candidate image components into the component template. After step S30, control is returned to step S25.

In step S25, as described above, a check is made again to determine whether there is any component template for which an image component has yet to be determined. Steps S25 through S30 are repeated until there is found no component template that has yet to accommodate an image component therein.

When in step S25 there is found no component template for which an image component has yet to be determined, i.e., when the image components have been inserted into all component templates in the selected template file, the first component inserting process is brought to an end. Control is then returned to the moving image creating process of FIG. 6.

In the first component inserting process, as described above, the image components are inserted into the component templates of the selected template file in such a manner that the chronological relations between the image components are kept intact, with the preferred components and the defined metadata duly taken into consideration.

Figure 8:
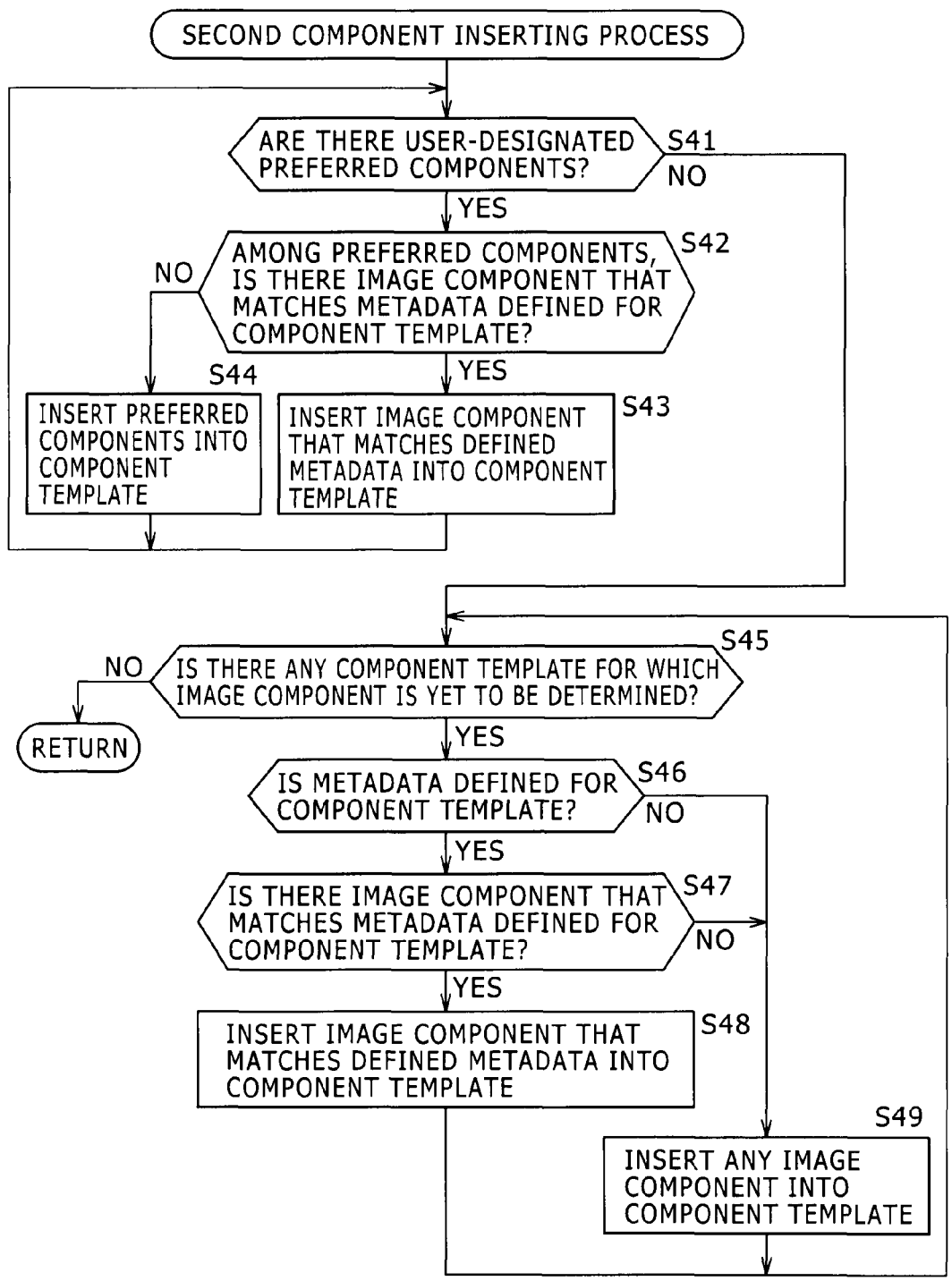
FIG. 8 is a flowchart of steps constituting the second component inserting process.

FIG. 8 is a flowchart of detailed steps constituting the second component inserting process performed in step S8 of FIG. 6.

In step S41, the image placement block 37 checks to determine whether there exist user-designated preferred components on the basis of the preferential selection information from the preferred component selection block 33.

If in step S41 user-designated preferred components are found to exist, then step S42 is reached. In step S42, the image placement block 37 checks to determine whether any one of the preferred components matches the metadata defined for any one of the component templates in the selected template file.

If in step S42 any one of the preferred components is found to match the metadata defined for any one of the component templates in the selected template file, then step S43 is reached. In step S43, the image placement block 37 inserts the matching image component into the corresponding component template of the selected template file.

If in step S42 none of the preferred components is found to match the metadata defined for the component templates in the selected template file, then control is passed on to step S44. In step S44, the image placement block 37 inserts any one of the preferred components into one of the component templates in the selected template file regardless of the metadata defined.

After step S43 or S44, control is returned to step S41, and steps S41 through S44 are repeated until the user-designated preferred components are found to have been exhausted. When there is no user-designated preferred component found to exist in step S41, control is passed on to step S45.

In step S45, the image placement block 37 checks to see whether the selected template file still contains any component template for which an image component has yet to be determined. If in step S45 a component template or templates that have yet to accommodate an image component therein are found to exist, then step S46 is reached. In step S46, the image placement block 37 checks to determine whether metadata is defined for any one of the component templates with no image component placed therein. If in step S46 no metadata is found to be defined for the component templates for which image components have yet to be determined, then step S49 is reached (to be discussed later).

If in step S46 metadata is found to be defined for one of the component templates that have yet to accommodate image components therein, then step S47 is reached. In step S47, the image placement block 37 checks to determine whether there exists an image component that matches the metadata defined for the component template in question. If in step S47 there is found no image component that would match the metadata defined for the component templates, then step S49 is reached.

If in step S47 there is found an image component that matches the metadata defined for one of the component templates, then step S48 is reached. In step S48, the image placement block 37 places the matching image component into the component template with the matching metadata. After step S48, control is returned to step S45.

In step S49, the image placement block 37 inserts any one of the image components into one of the component templates. After step S49, control is returned to step S45.

In step S45, as described above, a check is made again to determine whether there is any component template for which an image component has yet to be determined. Steps S45 through S49 are repeated until there is found no component template that has yet to accommodate an image component therein.

When in step S45 there is found no component template for which an image component has yet to be determined, i.e., when the image components have been inserted into all component templates in the selected template file, the second component inserting process is brought to an end. Control is then returned to the moving image creating process of FIG. 6.

In the second component inserting process, as discussed above, the image components are inserted into the arbitrary component templates of the selected template file in a manner taking the preferred components and the defined metadata into consideration.

It should be noted that if the number of preferred components turns out to be larger than the number of component templates in the selected template file during the first or the second component inserting process, there will appear preferred components that cannot be inserted into component templates.

Figure 9:
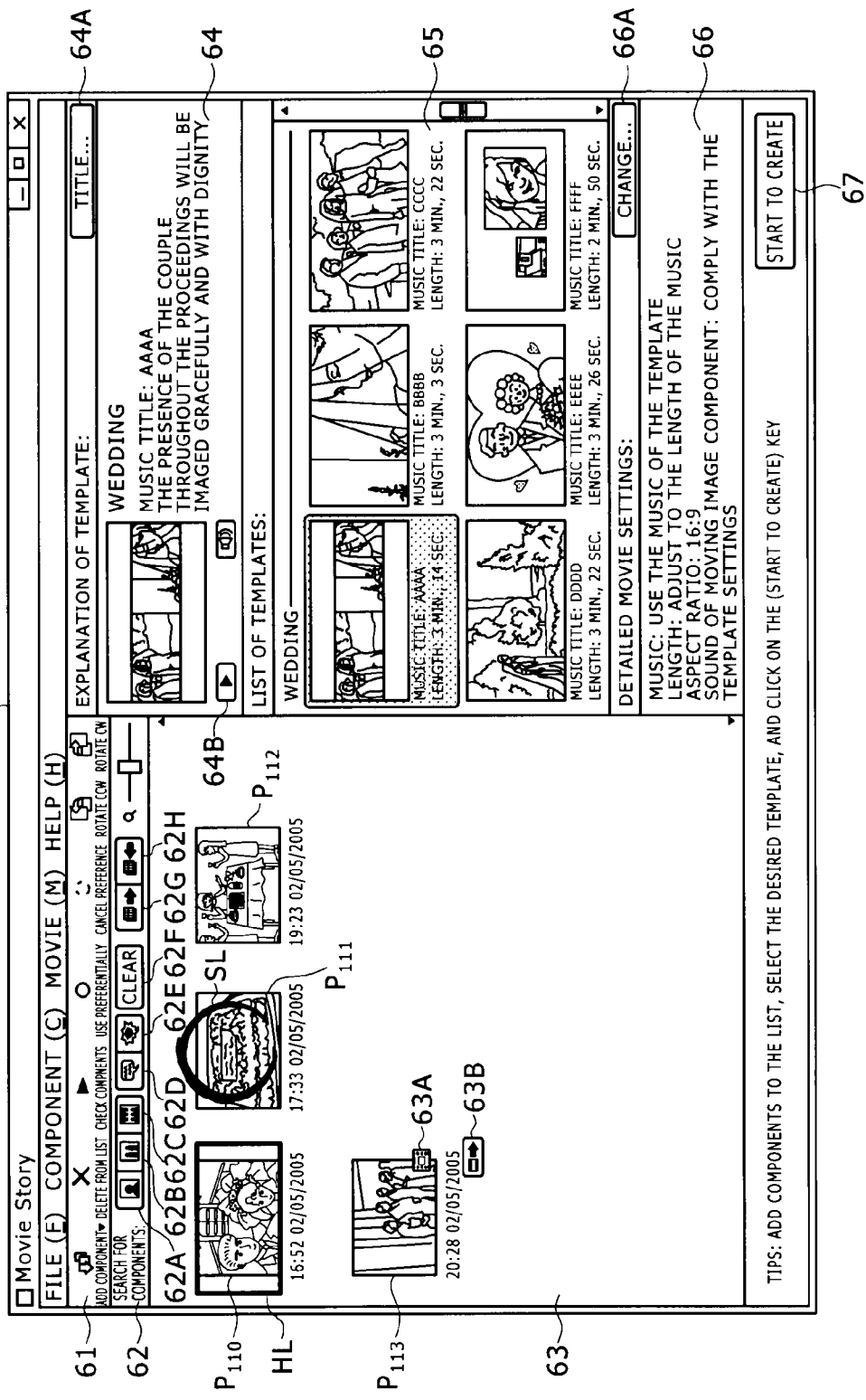
FIG. 9 is a schematic view showing a typical moving image creation designation screen.
Figure 10:
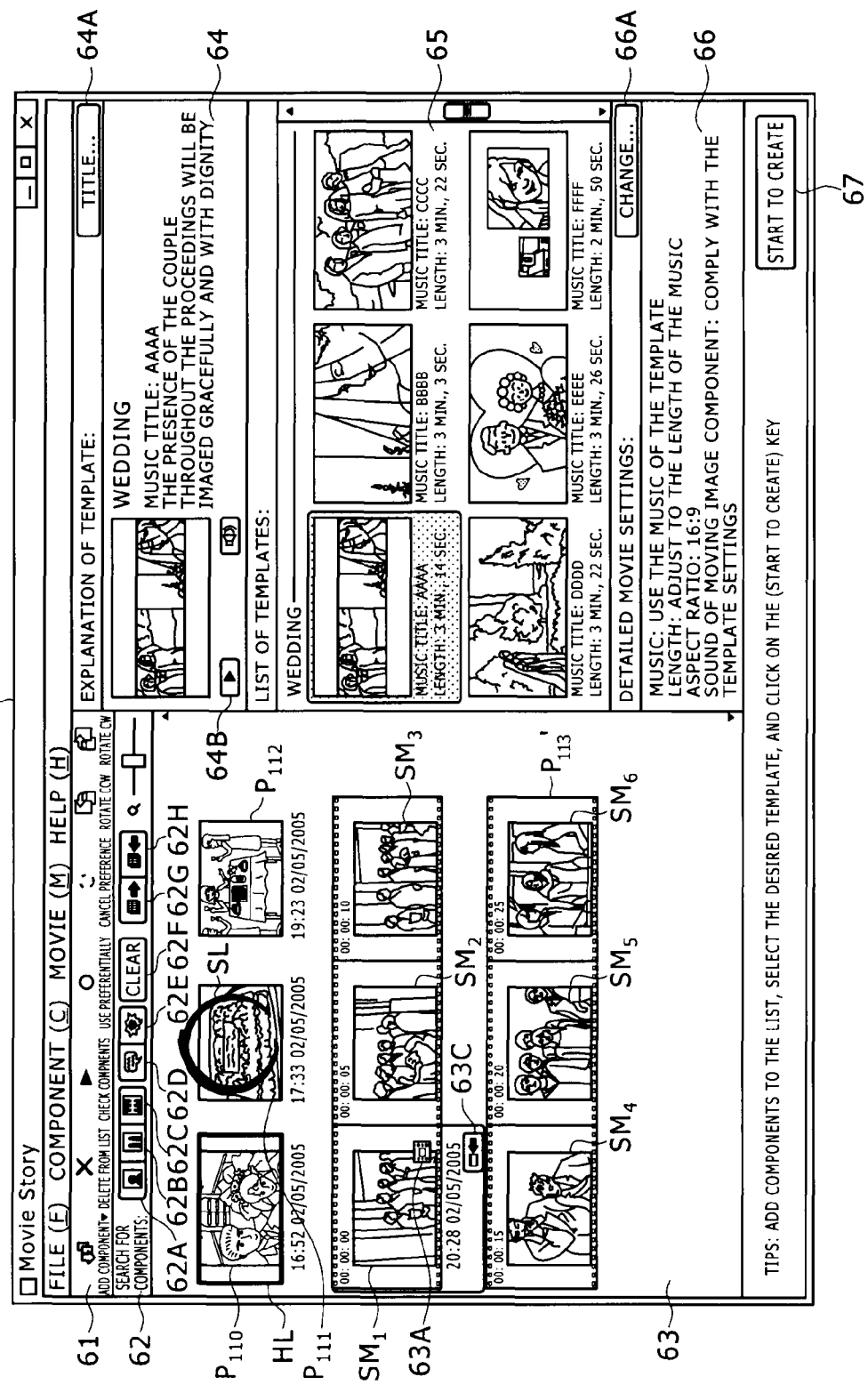
FIG. 10 is a schematic view showing another typical moving image creation designation screen.
Figure 13:
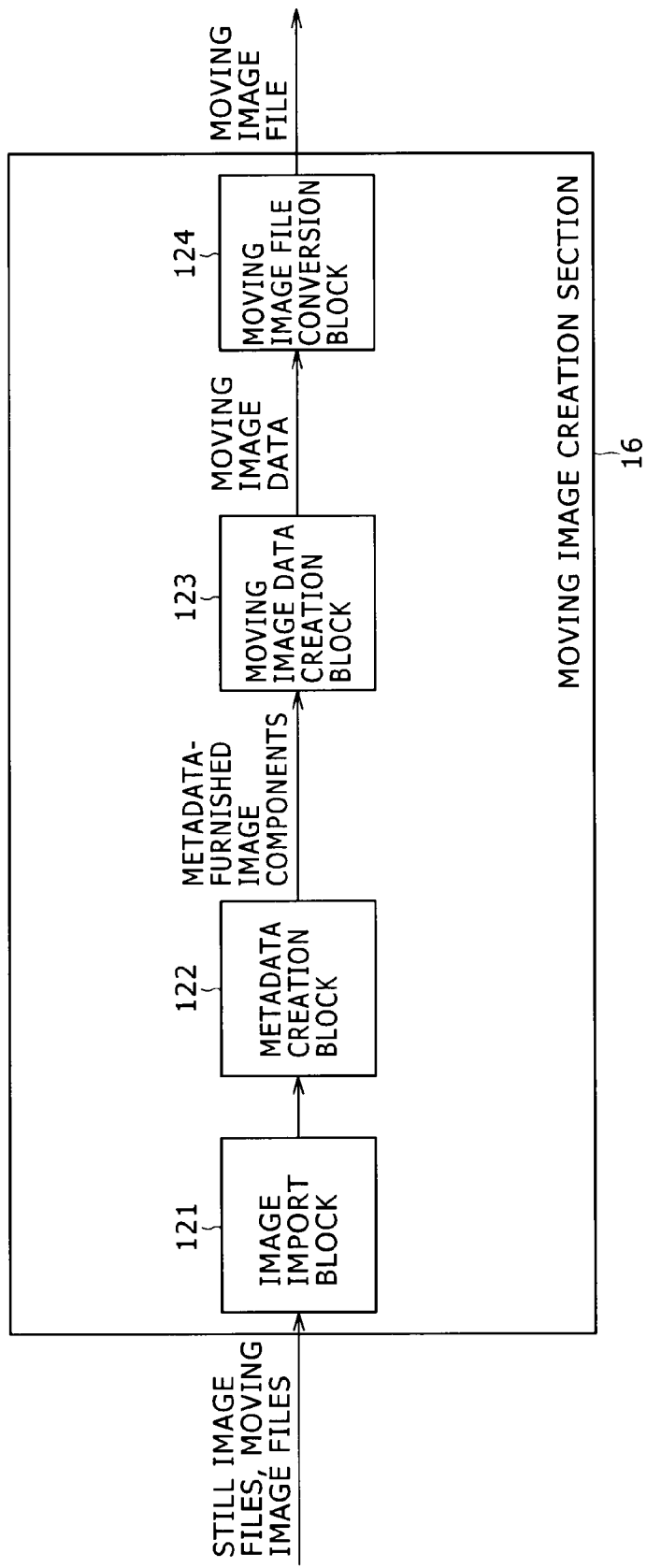
FIG. 13 is a block diagram showing another typical detailed structure of the moving image creation section.

Described below in reference to FIGS. 9 through 11 is the user interface (UI) of the moving image creating apparatus 1.

FIG. 9 schematically shows a typical moving image creation designation screen 51 displayed by the display section 14.

The moving image creation designation screen 51 includes: a first operation button area 61 that has operation buttons for adding an image component, designating a preferred component, and carrying out other functions; a second operation button area 62 that has operation buttons for filtering image components and for other operations; an image component listing area 63 that displays the image components stored in the temporary component storage block 31; a selected template file explanation area 64 that explains an outline of the selected template file; a template listing area 65 that displays in list form the template files held in the template file database 12; and a detailed display area 66 that displays detail settings for the selected template file. The indication "Movie Story" in the top left corner of the moving image creation designation screen 51 is the name of the application (program) displaying this screen 51.

The first operation button area 61 includes: an "Add component" button used for adding an image component to the temporary component storage block 31 from the component database 11; a "Delete from list" button for deleting an image component from the temporary component storage block 31; a "Check components" button for reproducing the image components for verification through display; a "Use preferentially" button for designating a preferred component; a "Cancel preference" button for canceling a preferred component; a "Rotate CCW" button for rotating an image component counterclockwise; and a "Rotate CW" button for rotating an image component clockwise.

The second operation button area 62 includes: highlight setting buttons 62A through 62E for highlighting, from at least one image component displayed in the image component listing area 63, only the image component that matches predetermined conditions; a highlight canceling (Clear) button 62F for canceling the highlight setting; a thumbnail development setting button 62G for setting the development of all moving image components shown in the image component listing area 63 into thumbnails arranged at predetermined time intervals; and a thumbnail development canceling button 62H for canceling the thumbnail development.

The highlight setting buttons 62A through 62E are each operated by the user. The highlight setting button 62A, when thus operated, highlights the image component in which a human face is shown in a close-up. The highlight setting button 62B, when operated, highlights the image component in which the number of people being imaged is small. The highlight setting button 62C when operated highlights the image component in which the number of people being imaged is large. The highlight setting button 62D when operated highlights the image component that includes voices. The highlight setting button 62E when operated highlights the image component that includes laughs.

The image component listing area 63 displays the image components held in the temporary component storage block 31. In the example of FIG. 9, the image component listing area 63 displays image components $P_{110}$ through $P_{113}$. The image components $P_{110}$ through $P_{112}$ are still images whereas the image component $P_{113}$ alone is a moving image. In the image component listing area 63, distinction between a moving and a still image is made by attaching a moving image icon 63A to the moving image component $P_{113}$. The moving image component $P_{113}$ is also furnished with a thumbnail development setting button 63B for developing solely the moving image in question into thumbnails.

Described below in reference to FIG. 10 is how operation of the thumbnail development setting button 63B develops illustratively the moving image component $P_{113}$ into thumbnails on the display screen.

The moving image creation designation screen 51 in FIG. 10 is the same as that in FIG. 9 except that the image component $P_{113}$ in the image component listing area 63 of FIG. 9 is replaced by an image component $P_{113}'$ being developed into thumbnails in FIG. 10.

The image component $P_{113}'$ is represented by thumbnails $SM_1$ through $SM_6$ shown arranged at predetermined time intervals (e.g., five seconds in FIG. 10). The thumbnail development setting button 63B appearing prior to thumbnail development in FIG. 9 is shown replaced in FIG. 10 by a thumbnail development canceling button 63C for canceling the thumbnail development of the image component $P_{113}'$ alone.

Returning to FIG. 9, the image component $P_{110}$ from among the image components $P_{110}$ through $P_{113}$ displayed in the image component listing area 63 is provided with a highlight indication HL. This indication signifies that the image component $P_{110}$ matches the condition stipulated by one of the highlight setting buttons 62A through 62E which has been operated.

A selection indication SL in the form of a circle (○) placed over the image component $P_{111}$ shows that this image component $P_{111}$ is being designated as a preferred component. If the user selects the image component $P_{111}$ using a mouse or the like and operates the "Cancel preference" button, then the designation of the preferred component is canceled and the selection indication SL disappears.

The selected template file explanation area 64 explains an outline of the template file currently selected by the user from the template listing area 65. It is possible to change the title of the template file using a title changing button 64A or reproduce the background music defined for the template file using a reproduction button 64B. These features allow the user to verify the taste and other attributes of each template file before finalizing the selection of a particular template file.

The template listing area 65 displays in list form the template files held in the template file database 12. In the template listing area 65, each template file is listed together with the title of the musical composition (i.e., music title) used as background music and the length of the file (i.e., moving image reproduction time). The thumbnail representing each template file is an image that expresses the taste such as background music and effect of the template file in question.

In the template listing area 65 of FIG. 9, the template file having the background music titled "AAAA" is shown selected by the user. An outline of the selected template file is displayed in the selected template file explanation area 64, and the details of the file in question are indicated in the detailed display area 66. It is possible to change the detail settings in the detailed display area 66 regarding the selected template file by operating a "Change" button 66A to invoke a detail setting screen 81 shown in FIG. 11. The detail settings established as desired on the detail setting screen 81 are displayed in the detailed display area 66. The items of the detail settings will be discussed later in reference to FIG. 11 and are thus not described here.

A "Start to Create" button 67 is an operation button used to start the moving image creating process explained above in reference to FIG. 6.

FIG. 11 schematically shows a typical detail setting screen 81 displayed by the display section 14 when the "Change" button 66A in FIG. 9 is operated.

On the detail setting screen 81, it is possible to set the items "Music to be used in the movie," "Length of the movie," "Sounds of the moving image components," and "Aspect ratio." On the detail setting screen 81, the term "movie" denotes the moving image data to be created through the moving image creating process, and the term "moving image components" represents moving image files out of image components.

The set item "Music to be used in the movie" is an item in which to establish the musical composition to be used during the reproduction of moving image data. One of radio buttons "Use the music of the template" and "Designate the music" may be selected. If the button "Use the music of the template" is selected, then the moving image creating apparatus 1 uses the background music defined beforehand for the template file in question. If the button "Designate the music" is selected, the moving image creating apparatus 1 utilizes the music to be designated by the user. In the latter case, the musical composition is specified by a file path which is input in an accompanying text box and which indicates the location of the music file.

The set item "Length of the movie" is an item in which to establish the total reproduction time of moving image data. One of radio buttons "Adjust to the length of the music" and "Designate the length" may be selected. If the button "Designate the length" is selected, the moving image creating apparatus 1 prolongs or truncates the template file of interest to the designated length. Illustratively, if the designated length exceeds the length of the musical composition in question, then the moving image creating apparatus 1 repeatedly reproduces the currently set music.

The set item "Sounds of the moving image components" is an item in which to establish the sounds to be output when the moving images inserted in the component templates of the template file are reproduced. One of radio buttons "Comply with the template settings," "Use the sounds of all moving image components," and "Use none of the sounds of the moving image components" may be selected.

The set item "Aspect ratio" is an item in which to establish the aspect ratio to be used for image display. Either the ratio "4:3" or the ratio "16:9" can be designated.

A "Reset to Default" button 81A is a button that may be operated to initialize the above-described set items (i.e., reset to default). If the user operates an "OK" button 81B, the settings (or changes) are reflected in the selected template file and are displayed in the detailed display area 66 of the moving image creation designation screen 51 in FIG. 9. If the user operates a "Cancel" button 81C, then the settings (or changes) made so far on the detail setting screen 81 are canceled, and the settings of the selected template file are kept unchanged.

As described above, when desired image components are added to the image component listing area 63 on the moving image creation designation screen 51 in FIG. 9, the moving image creating apparatus 1 places the added image components into the temporary component storage block 31. From the template files displayed in the template listing area 65, the user need only select a template file that matches the desired taste. The moving image creating apparatus 1 then completes the target moving image data (i.e., moving image file) using still or moving images that will unfold dramatically with effects and transitions to the accompaniment of background music.

As explained above in reference to FIG. 3, the temporary component storage block 31 may be omitted and image components may be retrieved directly from the component database 11. Ultimately, the user may designate only the template file to be used in creating moving image data. The moving image data will then be created together with background music, effects, transitions and other dramatic accompaniments. In other words, the moving image creating apparatus 1 can create the moving image data along with dramatic accompaniments such as musical compositions and special effects more easily than before.

The series of steps and processes described above may be executed either by hardware or by software. Where the software-based processing is to be carried out, the programs constituting the software may be either incorporated beforehand in dedicated hardware of a computer for program execution or installed upon use from a suitable program recording medium into a general-purpose personal computer or like equipment capable of executing diverse functions based on the installed programs.

FIG. 12 is a block diagram showing a typical hardware structure of a computer for carrying out the above-described series of steps and processes.

This computer has a CPU (central processing unit) 101, a ROM (read only memory) 102, and a RAM (random access memory) 103 interconnected by way of a bus 104.

The bus 104 is also connected with an input/output interface 105. The input/output interface 105 is connected to an input device 106, an output device 107, a storage device 108, a communication device 109, and a drive 110. The input device 106 is typically made up of a keyboard, a mouse and a microphone. The output device 107 is illustratively composed of a display unit and speakers. The storage device 108 is generally formed by a hard disk drive or a nonvolatile memory. The communication device 109 is typically constituted by a network interface. The drive 110 accommodates and drives removable media 111 such as a magnetic disk, an optical disk, a magneto-optical disk, or a semiconductor memory.

In the computer structured as outlined above, the CPU 101 loads relevant programs illustratively from the storage device 108 into the RAM 103 through the input/output interface 105 and bus 104. The loaded programs are executed by the CPU 101, whereby the above-described moving image creating process is carried out.

Illustratively, the component database 11 and template file database 12 in FIG. 2 correspond to the storage device 108 in FIG. 12, and the screen creation section 13 and moving image creation section 16 in FIG. 2 correspond to the CPU 101 in FIG. 12. Likewise, the display section 14 in FIG. 2 corresponds to the output device 107 in FIG. 12, and the operation input section 15 in FIG. 2 to the input device 106 in FIG. 12.

The programs to be executed by the computer (i.e., CPU 101) are distributed either on the removable media 111 constituting package media such as magnetic disks (including flexible disks), optical disks (including CD-ROM (compact disc-read only memory) and DVD (digital versatile disc)), magneto-optical disks, or semiconductor memories; or by way of wired or wireless communication media such as local area networks, the Internet, or digital satellite broadcasting networks.

With a piece of removable media 111 attached to the drive 110, the programs held on the loaded medium may be installed into the storage device 108 through the input/output interface 105. Alternatively, the programs may be received by the communication device 109 via wired or wireless communication media before being installed into the storage device 108. As another alternative, the programs may be installed beforehand in the ROM 102 or storage device 108.

In this specification, the programs to be executed by the computer may be carried out in the depicted sequence (i.e., on a time-series basis), in parallel fashion, or individually when they are invoked as needed.

When the above-described moving image creating process is to be carried out by software, the series of steps and processes involved may be implemented either by a single application program or by a plurality of functionally divided application programs.

Illustratively, the moving image creation section 16 may be implemented using a plurality of functions: the image components (still or moving image files) held in the temporary component storage block 31 are first imported from there; the imported image components are then analyzed and their metadata are created; the image components together with their metadata are acquired and their metadata is analyzed (for detail settings) so that the image components optimally matching the metadata defined for the component templates in the selected template file are inserted into the matching component templates so as to create moving image data in the XML format or the like; and the moving image data typically in the XML format is converted to a moving image file in a format such as that of the MPEG standard. These functions are practiced illustratively in the form of a metadata creation block 122 for creating metadata, a moving image data creation block 123 for creating moving image data, and a moving image file conversion block 124 for converting moving image data into a moving image file, the blocks being implemented by an independent application program each. An image import block 121 for importing image components may be included in the application program for implementing the moving data creating function.

The application program for implementing the moving data creating function supplies the imported image components to the application having the metadata creating function, whereby metadata about the image components may be created. The image components are thus acquired along with the created metadata. The application for executing the moving data creating function creates moving image data through the use of the image components together with their metadata and the selected template file. The created moving image data is sent to the application having the moving file converting function. In turn, the latter application converts the moving image data into a moving image file that is then output.

Alternatively, the moving image creating process may be implemented using application programs with their functions divided in a manner other than that described above.

In this specification, the steps described in the accompanying flowcharts represent not only the processes that are to be carried out in the depicted sequence (i.e., on a time-series basis) but also processes that may be performed parallelly or individually and not chronologically.

It should be understood by those skilled in the art that various modifications, combinations, sub-combinations and alterations may occur depending on design requirements and other factor in so far as they are within the scope of the appended claims or the equivalents thereof.

What is claimed is:

1. A moving image creating apparatus for creating moving image data using a plurality of images, said moving image creating apparatus comprising:
   template file storage means for storing a plurality of template files each of which holds a plurality of component templates each for accommodating an image;
   selection means for selecting any one of said plurality of template files stored in said template file storage means;
   component metadata analysis means for analyzing metadata about each of said plurality of images;
   component template metadata analysis means for analyzing metadata about each of said plurality of component templates in the selected template file; and
   image placement means for placing said images into said component templates of said selected template file in accordance with the analyzed metadata about said images and the analyzed metadata about said component templates, wherein the image placement means places one of said plurality of images into one of said component templates of said selected template file, in response to a determination that none of the metadata about each of said plurality of images matches the analyzed metadata about the one of said component templates.

2. The moving image creating apparatus according to claim 1, wherein said image placement means checks to determine whether said metadata about any one of said images matches said metadata about any one of said component templates and places the image with the matching metadata into the matching component template of said template file.

3. The moving image creating apparatus according to claim 1, wherein each of said template files includes time-series information defining whether or not images are to be placed chronologically into said plurality of component templates, said moving image creating apparatus further comprising:
   time-series determination means for determining whether or not said selected template file is defined to permit time-series placement of images, and,
   if said selected template file is defined to permit the time-series placement of images, then said image placement means places said images chronologically into said component templates of said selected template file.

4. The moving image creating apparatus according to claim 1, further comprising:
   image storage means for storing said plurality of images, wherein, from among said images stored in said image storage means, said selection means selects preferred images to be placed preferentially into said component templates of said selected template file, and said image placement means places said preferred images preferentially into said component templates of said selected template file.

5. The moving image creating apparatus according to claim 1, wherein said images are either moving images or still images, said metadata about said images represents information indicating whether said images are the moving images or the still images, whether the number of people included in said images is large or small, or whether said images include people, and said metadata about said component templates represents information indicating whether images to be placed in said component templates are moving images or still images, whether the number of people included in said images to be placed is large or small, or whether said images to be placed include people.

6. The moving image creating apparatus according to claim 1, further comprising:
   screen creation means for creating a screen on which to display thumbnails of said plurality of images, wherein said screen creation means highlights a thumbnail corresponding to information represented by said metadata about said images.

7. The moving image creating apparatus according to claim 1, wherein each of said template files holds background music constituting a musical composition to be played during an image reproduction.

8. The moving image creating apparatus according to claim 1, wherein each of said template files holds at least one effect template and at least one transition template in addition to said plurality of component templates for accommodating an image each, said effect template defining an effect to be applied to an image, said transition template defining a type of transition to take place from an image placed in a first component template to an image placed in a second component template.

9. A moving image creating method for carrying out a moving image creating process which creates moving image data using a plurality of images, said moving image creating method comprising:
- selecting any one of a plurality of template files each of which holds a plurality of component templates each for accommodating an image;
- analyzing metadata about each of said plurality of images;
- analyzing metadata about each of said plurality of component templates in the selected template file; and
- placing said images into said component templates of said selected template file in accordance with the analyzed metadata about said images and the analyzed metadata about said component templates, wherein the placing places one of said plurality of images into one of said component templates of said selected template file, in response to a determination that none of the metadata about each of said plurality of images matches the analyzed metadata about the one of said component templates.

10. A non-transitory recording medium which stores a program for causing a computer to carry out a moving image creating process for creating moving image data using a plurality of images, said moving image creating process comprising:
- selecting any one of a plurality of template files each of which holds a plurality of component templates each for accommodating an image;
- analyzing metadata about each of said plurality of images;
- analyzing metadata about each of said plurality of component templates in the selected template file; and
- placing said images into said component templates of said selected template file in accordance with the analyzed metadata about said images and the analyzed metadata about said component templates, wherein the placing places one of said plurality of images into one of said component templates of said selected template file, in response to a determination that none of the metadata about each of said plurality of images matches the analyzed metadata about the one of said component templates.

11. A moving image creating apparatus for creating moving image data using a plurality of images, said moving image creating apparatus comprising:
- a memory that stores a plurality of template files each of which holds a plurality of component templates each for accommodating an image;
- an input device that selects any one of said plurality of template files stored in said memory; and
- at least one processor configured to analyze metadata about each of said plurality of images,
- at least one processor further configured to analyze metadata about each of said plurality of component templates in the selected template file,
- at least one processor further configured to place said images into said component templates of said selected template file in accordance with the analyzed metadata about said images and the analyzed metadata about said component templates and to place one of said plurality of images into one of said component templates of said selected template file, in response to a determination that none of the metadata about each of said plurality of images matches the analyzed metadata about the one of said component templates.

* * * * *